United States Patent Office 3,491,052
Patented Jan. 20, 1970

3,491,052
PROCESS FOR COMPOUNDING ELASTOMERS
Paul N. Hare, Swartz, Lynn Parker, West Monroe, and George L. De Cuir, Monroe, La., assignors to Columbian Carbon Company, New York, N.Y., a corporation of Delaware
No Drawing. Continuation-in-part of application Ser. No. 231,011, Oct. 16, 1962. This application Dec. 15, 1966, Ser. No. 601,843
Int. Cl. C08d 7/02, 9/16; C08i 1/46
U.S. Cl. 260—29.7    19 Claims

ABSTRACT OF THE DISCLOSURE

A process for producing a homogeneous blended elastomer coagulum by compounding an elastomer in latex form with an elastomer dissolved in a water immisicible organic solvent with agitation, and thereafter agglutinating the mixed elastomers by heating the thus formed pseudo-emulsion in the presence of a latex coagulating agent so as to vaporize and remove the organic solvent, but not the water, to form a blended rubber crumb in the remaining water. The rubber crumb may be separated from the water and dried, and carbon black or extender oil may be added prior to coagulation.

---

This application is a continuation-in-part of copending application Ser. No. 231,011, Oct. 16, 1962, entitled "Process for Compounding Elastomers," filed by the applicants hereof and asigned to the same asignee, now abandoned.

This invention relates to improvements in the compounding of natural and synthetic rubbers and similar polymeric materials, herein collectively referred to as "elastomers," and provides improved blending and compounding methods whereby two or more elastomers of different types and in different forms may be more economically and more effectively blended to produce homogeneous elastomer blends. The invention is especially useful in the producing blended elastomer compositions reinforced by pigmentary materials, for instance carbon black, and provides an improved method and means for producing reinforced elastomer blends which are especially suitable for pneumatic tire tread.

Through relatively recent development, in the fields of synthetic elastomers, and especially through the use of solution polymerization using stereo-specific catalysts, a number of synthetic elastomers having unique and highly valuable properties have been produced, including homopolymers, notably polybutadiene, polyisoprene, and polyisobutylene.

Many of these newer, synthetic elastomers can be made into cured compositions having unique and outstanding properties. However, they have not been found well suited for producing pneumatic tire tread stock except when blended with other elastomers, for instance styrene-butadiene rubber (SBR) or natural rubber.

Pneumatic tire treads having superior aging properties, superior abrasion and groove cracking resistance, greater traction and lower heat build-up than the more conventional tire treads produced from SBR have been produced from carbon black-reinforced blends of SBR and the so-called stereo-specific rubbers, notably cis-1-4, polybutadiene.

It has previously been proposed to produce carbon black-reinforced elastomer blends, such as noted, by dry-mixing of the rubber constitiuents and carbon black in masticating machinery, such as a roll mill or a Banbury mixer. But attempts to effect a homogeneous blending of the elastomer constituents in this way have been time-consuming and require a large amount of energy. More important, many of these more recently developed elastomers cannot be satisfactorily compounded by the dry-mixing technique. Polybutadiene, for example, has very little tack and will not "band" properly on a roll mill. Dry-mixing difficulties become progressively worse as the ratio of polybutadiene to SBR is increased. Attempts to blend the elastomers in liquid form have also presented difficulties.

The more generally used synthetic elastomers, such as styrene-butadiene rubber (SBR), are produced by the well-known emulsion polymerization method and the resultant product is in the latex form, i.e., an aqueous colloidal dispersion. Natural rubber is also obtained in latex form.

On the other hand, many of the more recently developed elastomers are produced by solution polymerization methods and the resultant product is a viscous solution of the polymer in an organic solvent. Such solutions are conventionally referred to as "rubber cement."

By reason of the fact that the organic solvents of the rubber cements are immiscible with the aqueous phase of the latices, difficulties have been experienced in attempts to blend the two different rubber constituents while in such liquefied forms.

Though it is possible to separate the polymer from the aqueous constitiuent of the latex by coagulation and then dissolve the separated polymer in an organic solvent, thus obtaining a rubber cement, which then can be blended with another polymeric cement, such procedure requires additional process steps and additional equipment as well as additional labor and materially adds to the cost of the ultimate produce and homogeneity is not necessarily assured by working with both polymers in solution. Some of the elastomers obtained by solvent polymerization in the form of rubber cements may be separated from the solvent and emulsified with water to form a latex, but with other elastomers of this type, this procedure is difficult or impossible from a practical viewpoint. In any event, additional time, labor and equipment would be required.

We have discovered that a homogeneous blend of elastomers may be produced by compounding an elastomer in latex form with an elastomer dissolved in a water immiscible organic solvent by thorough mixing in the liquid form, with vigorous agitation, to form a pseudo-emulsion in which the elastomers are thoroughly compounded in the liquid phase. The mixed elastomers are thereafter agglutinated simultaneously, without further compounding, by heating the pseudo-emulsion in the presence of a latex coagulating agent. The coagulating step is carried out at a temperature at which the organic solvent vaporizes, yet which precludes substantial vaporization of water in the pseudo-emulsion. The organic solvent is thus vaporized and removed from the presence of the elastomers, the resultant coagulum forming as a crumb in the presence of water in the liquid phase. The crumb is then separated from the liquid constituents by conventional means, e.g., filtration, washed and dried to provide an essentially pure, water-free coagulum in blended form.

It will be understood that reference herein to an elastomer dissolved in an organic solvent is intended to include either en elastomer solution, per se, or any such dissolved elastomer in which rubber pigments or other compounding materials or both, have been incorporated. Likewise, reference herein to an elastomer in the form of latex is intended to include the latex, as such, or a latex containing rubber pigments or other compounding materials, or both.

The term pseudo-emulsion, as used herein, refers to an intimate blend of immiscible liquids such as may be formed by violent, short term mechanical agitation, or agitation which is less severe but of a much longer term, which results in sufficient shearing of the liquid streams to form very tiny droplets so that the immiscible liquids are very thoroughly commingled together. Without employing an emulsifying agent, such pseudo-emulsions may exist for only a short period of time if not maintained under agitation, but it should be pointed out that emulsifying agents for stabilization of the pseudo-emulsion are not essential to this invention, i.e., the pseudo-emulsion may be subjected to coagulation very soon after formation and the pseudo-emulsion may be subjected to sufficient agitation, between formation and coagulation, to prevent phase separation of the immiscible liquid constituents. When forming the pseudo-emulsion, it is frequently advantageous to employ sufficient turbulence and shear to cream the latex by mechanical agitation prior to coagulation of the liquid elastomer blend. Accordingly, the latex dispersion may be partially destabilized, without chemical creaming agents, prior to agglutination of the mixed elastomers by means of heat and a latex coagulating agent.

Where it is desired to incorporate a pigment in the elastomer blend, e.g., carbon black, this is effected in accordance with our invention, with marked advantage, by dispersing the pigment in the pseudo-emulsion prior to coagulation without deleteriously affecting the blending of the elastomers. Upon coagulation, as previously described, there is obtained a coagulum comprising a uniform blend of the elastomers having the pigment uniformly dispersed and bound therein. The pigment may also be dispersed in either one or both of the elastomers in liquid form prior to forming the pseudo-emulsion.

Also, where desired, other compounding agents, for instance extender or softener oils, vulcanizing agents and the like may be incorporated in the pseudo-emulsion prior to the coagulation step so that dry-milling or mastication requirements are either eliminated or greatly reduced. If desired, the extender or processing oils may be predispersed in either one or both of the elastomer systems prior to forming the pseudo-emulsion.

The simultaneous agglutination of the blended elastomers may be effected by mixing the pseudo-emulsion with a hot aqueous solution of a latex coagulating agent, e.g., an acid, at a temperature above the boiling point of the organic solvent of the dissolved elastomer, but below a temperature at which the water content of the pseudo-emulsion is substantially vaporized. Accordingly, the solvent may be vaporized and separated from the presence of the elastomers, thus permitting the formation of a blended elastomer coagulum in the form of a wet rubber crumb. After coagulation, the solvent for the dissolved elastomer may be condensed, collected and condensed while the wet rubber crumb is washed with fresh water, to remove impurities such as acids and soap residues, prior to drying.

In addition to the stereo-specific homopolymers previously referred to, the invention is also applicable to the forming of elastomer blends in which the elastomer constituent of the elastomer dissolved in an organic solvent comprises mixed polymers such as butyl, chlorobutyl or ethylene-propylene rubbers.

The organic solvent constituents of the dissolved elastomer used in accordance with this invention may be either the monomer from which the elastomer was formed or any of the well-known commercial solvents, for instance hexane, heptane, benzene, ethers, chloronated hydrocarbons or the like, in which the elastomer is soluble, and which is readily vaporized at temperatures to which the rubber constituents can be subjected without detrimental results.

The elastomers available in dissolved form which may be used in accordance with this invention include polybutadiene, polyisoprene, polyisobutylene, butyl, chlorobutyl, polychloroprene, copolymers of butadiene, copolymers of isoprene, ethylene-propylene copolymers, natural rubber, acrylics, and, in fact, any elastomer which may be dissolved in an organic liquid such as described above.

Likewise, as the elastomer in latex form, one may use any elastomer which can be emulsified in water including natural rubber, nitrile rubbers, acrylics, styrene-butadiene copolymers (SBR) and other synthetic rubbers, e.g., chloroprene or butadiene-acrylonitrile. However, the invention is especially useful in the blending of two or more elastomers at least one of which is more readily or more economically available as an elastomer dissolved in an organic solvent and at least one is more readily or more economically as an elastomer in latex form.

As previously noted, a particularly advantageous aspect of the invention is in the blending of a stereo-specific rubber with a more conventional type of elastomer.

These stereo-specific polymers are alkene or olefin polymers produced through the use of highly specific catalyst resulting in polymers having a predetermined geometric arrangement of molecules. These polymers are produced by solution polymerization, the monomeric substance being dissolved in an inert organic liquid, such as a saturated hydrocarbon. Polymers of this type include cis-1,4 polybutadiene, trans-1,4 polybutadiene, cis-1,4 polyisoprene, ethylene-propylene and a rubber marketed under the trade name "Diene" and composed of approximately 10% 1,2-polybutadiene, 60% trans-1,4 polybutadiene and 30% cis-1,4 polybutadiene contained in the same polymer chain.

Other rubbers from which rubber cement may be made by dissolving the dry coagulated rubber include butyl, ethylene-propylene, styrene-butadiene and chloroprene.

In place of carbon black, other pigmentary reinforcing agents or fillers may be used, for instance silica, titania or the like, depending upon the desired properties of the resultant elastomer compound. For rubber reinforcement, carbon black is generally preferred and the invention is not restricted as to the grade of carbon black used, the choice of type depending primarily on the properties desired in the finished rubber product.

A further advantage of our invention is that unpigmented homogeneous blends of elastomers, or black-rubber masterbatches containing a blend of elastomers, can be formed by mixing and agglutinating the ingredients in liquid phase without the use of chemical stabilizers, emulsifiers, dispersing agents and the like. We are able to accomplish adequate mixing, dispersion, and homogenization by means which impart hydraulic turbulence and shearing forces to the fluid constituents involved in the blending operation.

In forming black-rubber masterbatches containing a blend of elastomers in accordance with the present invention, an aqueous dispersion of carbon black particles can be incorporated into the pseudo-emulsion so that the immiscible droplets containing the respective elastomers are intimately commingled with the dispersed carbon black in such a way that the particles are transferred from their aqueous dispersion medium, to each respective elastomer, without substantial reagglomeration of the carbon particles. Such compounding of the elastomers and pigment in the liquid phase favors intimate molecular contact between the carbon particles and the elastomers. Further, intimate pigment-elastomer contact is favored by the low viscosity inherent in the liquid phase compounding systems employed with this invention. In general, the more intimate contact between pigment and elastomer provides for better "wetting" of the pigment particles by the elastomer, and this is conducive to measurably improved adhesion of the two materials within the masterbatch compound. Therefore, relative to dry mixing, this improved adhesion generally manifests itself by higher carbon gel, indicating bound rubber, content in the uncured compound and higher reinforcement characteristics in the cured compound.

It is generally known that the high shear forces generated during mixing of elastomers in the substantially dry, plastic state modify both the molecular weight of the elastomer and the structure of the carbon black. Another advantage of the present invention is that substantially less energy is transferred to the elastomers and the carbon black during the compounding operation, and since the mixing is carried out in the liquid phase, the physical properties of the elastomers and the carbon black are affected less severely, if at all, than result from the more severe compounding previously required in the production of homogeneous elastomer blends.

It will thus be appreciated that compounding of the elastomers and carbon black, when the latter is included, is accomplished, in the process of the present invention, entirely within the liquid phase prior to coagulation. Little or no mechanical energy is required in the coagulation of the elastomers following formation of the pseudo-emulsion. When it is employed in that step of the process, generally for mild agitation of the coagulum within the solution of latex coagulating agent to prevent excessive sticking together of the crumb, the amount of mechanical energy available for transfer into the elastomers themselves is relatively less than is employed for forming the pseudo-emulsion. For example, the amount of mechanical energy employed per unit of mass and time during the coagulation step may be about 2–3 times less than that employed in the initial compounding step used to form the pseudo-emulsion.

The invention will be further described and illustrated with reference to apparatus especially adapted to carrying out the process, and more particularly that aspect thereof in which black-rubber masterbatches are formed from a carbon black slurry, an emulsified elastomer, and a dissolved elastomer.

It should be understood, however, that the apparatus referred to is only intended to illustrate a particularly advantageous commercial installation adapted to the carrying out of our process. A number of possible modifications will be apparent to those skilled in the art, in view of our present disclosure.

In this embodiment of the invention, water at a constant, measured rate is charged to a mixing funnel while carbon black, at a constant rate, is charged to the mixing funnel through a metering conveyor. From the mixing funnel, the water and carbon black, in the predetermined proportions, pass to a centrifugal pump, by which the water and carbon black are primarily mixed and charged to a disperser wherein aggregates of the carbon black are broken up, and the carbon black is uniformly dispersed in the water to form a flowing stream of carbon black slurry of uniform composition, which passes from the downstream end of the disperser.

Where a more discrete dispersion of the carbon black is desired, the slurry from the disperser may be passed through a colloid mill. The carbon black slurry stream is split into two portions. One portion is fed at a constant, measured rate to a mixer while the other portion is fed at a constant, measured rate to a flusher. Rubber latex is fed at a constant, measured rate from a latex supply, and is passed to the said mixer. Dissolved rubber is fed from a rubber cement supply to a positive displacement pump. At a constant, measured rate, the dissolved rubber is thus passed to the flusher. A thoroughly mixed stream of carbon black and latex, herein designated "carbex," is passed from the first said mixer to a second mixer while a homogeneous, pseudo-emulsified stream of carbon black slurry and dissolved rubber is simultaneously passed from the flusher to the mixer second. The carbex and the pseudo-emulsion are thoroughly homogenized in the second said mixer by violent hydraulic turbulence before being passed to a heated coagulator.

Within the coagulator the two rubbers are simultaneously coagulated by the action of heat and a chemical coagulating agent to form a rubber crumb containing dispersed carbon black. A coagulating agent, such as sulfuric acid or alum, is fed at a predetermined, measured rate from the coagulant supply and introduced into the coagulator.

Organic solvent in the dissolved rubber is vaporized by heat supplied to the coagulator by any convenient means, and a stream containing water, organic solvent vapor, and black-rubber crumb is discharged from the coagulator. The organic vapor is separated from the coagulator effluent and passed to a solvent recovery system. Water and black-rubber crumb are conveyed to a washer and filter, whereby the black-rubber crumb is washed to remove soap residues and filtered to remove most of the water. The washed and filtered crumb is dried by conventional means, and may then be baled or processed in any conventional manner.

All, or a portion of water separated from the black-rubber crumb in the washer and filter, may be discharged or recycled to the coagulator.

When using elastomer solutions of high viscosity, it is sometimes desirable to mix extra water into the pseudo-emulsion. This extra water may be introduced into the flusher at a constant and measured rate.

For producing a continuous flowing stream of carbon black slurry, we have with advantage used a disperser of the type described and claimed in U.S. Patent 2,972,473. With appropriate modification of the inlet connections, the apparatus of the patent is also advantageously used as the flusher.

The dissolved elastomer and the carbon black slurry are formed into a pseudo-emulsion within the flusher by mechanically imparted violent hydraulic turbulence and shear. While the elastomer and carbon black slurry are thus emulsified, the carbon black flushes from the aqueous phase to the organic phase, which is to say that the carbon leaves its slurry water and enters into the dissolved elastomer solution.

The above-mentioned violent hydraulic turbulence and shear is characteristic of the operation of the apparatus of U.S. Patent No. 2,972,473. Its use is particularly advantageous due to the fact that the process can thereby be streamlined and operated continuously with precise control of proportions. Another important advantage is the large throughput possible with this type of apparatus. However, it will be understood that the use of this particular type of disperser is not essential to the present invention, and mixers of other types, either continuous or batch, may be used in carrying out the present process.

When an extending or processing oil is to be compounded with the rubber employed in latex form, it may be fed at a constant, measured rate from the oil supply into the first said mixer, whereby the oil, latex, and carbon black fed to the mixer are thoroughly homogenized therein.

When an extending or processing oil is to be compounded with the rubber employed in a dissolved state, it is fed to the flusher at a constant, measured rate from the oil supply, whereupon the oil dissolves in the elastomer solution or is thoroughly homogenized therewith in the flusher.

For the previously noted mixers, we have used fluid injectors, but mixing nozzles or other apparatus may be used whereby fluid streams are commingled and thoroughly mixed together.

The coagulator may be any suitable apparatus wherein the commingled pseudo-emulsion-carbex can be heated to a temperature above the vaporizing point of the organic solvent constituent of the dissolved elastomer. The dissolved rubber is thus desolvented and thereby coagulated. A coagulating agent is added to the pseudo-emulsion-carbex mixture in the coagulator. Rubber crumbs containing a blend of the two elastomers are obtained by coalescing both elastomers by simultaneous coagulation while they are thoroughly mixed together in a liquefied state. Upon coagulation, carbon black and oils, and other compounding agents included in the mixture, are bound into the rubber crumbs, and black-rubber masterbatches are thus formed.

To streamline the coagulation operation and make it continuous, we have continuously fed hot water and the pseudo-emulsion-carbex mixture into a closed chamber wherein the two streams are commingled and coagulation effected. A chemical coagulating agent is introduced into the coagulating zone by adding it to the entering hot water stream. Alternately, the pseudo-emulsion-carbex may be coagulated by otherwise mixing it with a stream of steam or superheated water, or any other suitable means may be used.

It is important that the carbon black slurry and dissolved elastomer be vigorously agitated within the flusher in order to transfer, or flush, the carbon from the water phase into the organic phase. By flushing the carbon black from the one phase to the other, efficient inclusion of the black in the rubber crumb is assured upon coagulation of the dissolved elastomer, as described and claimed in copending application Ser. No. 128,749, filed Aug. 2, 1961.

The concentration of the respective elastomers in their liquid vehicles is not critical. For convenience in carrying out the operation, an elastomer solution of about 5% to about 30% of rubber, by weight, and a latex of about 5% to 40% of rubber, by weight, are presently preferred. However, more dilute concentrations can be successfully used, in accordance with our invention, as can also higher concentrations, provided they are readily flowable.

The carbon black slurry used in our process may be prepared either as a continuously flowing stream or batchwise. A primary requirement is to obtain a reasonably good dispersion of the carbon black in water. We have found that as the dispersion of the carbon black in the slurry is improved, the dispersion of carbon black in the rubber is usually improved. However, good results may be obtained even when there is relatively poor dispersion of the carbon black in the slurry used.

As previously noted, any type of carbon black, and also other compounding ingredients, can be dispersed in the rubber blend by this process. For pneumatic tires, high abrasion furnace black (HAF), intermediate super abrasion furnace black (ISAF), or super abrasion furnace black (SAF) are frequently preferred. Carbon blacks inherently having high or low structure may also be used as well as attrited and certain types of carbon blacks demonstrating hydrophilic tendencies.

The proportion of carbon black used may range upwardly to higher than 150 parts of carbon black per 100 parts of rubber, on the dry weight basis; however, the preferred proportion of carbon black, particularly for tire tread use, is usually within the range of 30–80 parts of carbon black per 100 parts of the rubber solid derived from latex and 40–100 parts of carbon black per 100 parts of rubber solid derived from an elastomer solution.

Although the process of the invention can be satisfactorily carried out by forming the pseudo-emulsion from the elastomer solution and carbon black slurry only, we have found it advantageous, on certain occasions, as previously noted, to use additional water in forming the pseudo-emulsion. The mixing action, flushing, and dispersion of the carbon black in the elastomer solution is sometimes improved by this water addition, particularly when the elastomer solution is of high molecular weight or viscosity. This water may be charged into the flusher.

As was previously pointed out, the present invention is characterized by the fact that the coagulation may be performed at a mechanical energy level which is significantly less than that employed during the formation of the pseudo-emulsion, since little if any input of mechanical energy into the elastomers is required for effecting coagulation. As a consequence, the pseudo-emulsion may be formed while transferring one level of mechanical energy per unit of mass and time into the elastomer contents of the latex and cement while the level of mechanical energy transferred into the elastomers per equivalent unit of mass and time during their coagulation is relatively less than during formation of the pseudo-emulsion. Accordingly, only brief mixing periods are required, and the processes may be carried out batchwise or continously. Furthermore, the power requirement for mixing is minimized because of the low viscosity of the carbon black slurries and pseudo-emulsions formed in carrying out the present invention. In the present process, the mechanical energy required to effect complete compounding of the ingredients prior to coagulating the elastomers may be only a fraction of previous processes, e.g., substantially less and generally no greater than about ⅓ of the horsepower required for producing blends of elastomers within a devolatilizer-extruder type apparatus, wherein the elastomers are first mechanically mixed at one level of energy input and are then simultaneously intimately blended and devolatilized, to effect coagulation, at a substantially greater level of input.

The invention has also been practiced by passing both latex and rubber cement through the flusher with the carbon black slurry to form a pseudo-emulsion of all the constituents, thereby eliminating the mixers. Also, the invention has been practiced by mixing all of the carbon black slurry with the latex, and by passing all of the carbon black slurry through the flusher with the rubber cement. Also, all of the carbon black slurry has been mixed with the dissolved elastomer before it was introduced into the flusher, with the latex also being passed to the flusher; and alternately carbon-free latex may be added to the carbon-containing pseudo-emulsion at the second said mixer. Also, carbon black slurry, latex and dissolved elastomer may be introduced into the flusher without any intermediate mixing of the three. The sequence of mixing, therefore, does not appear to be essential to the execution of the invention.

The use of more than one carbon black slurry is also anticipated by this invention, e.g., more than one carbon black may be slurried in the water and incorporated into the rubber blend, or two or more slurry streams can be formed from two or more different carbon blacks and independently mixed with two or more elastomers.

The invention is not, therefore, limited to the number of elastomers which can be blended, nor to the number of carbon blacks or other reinforcing agents which can be incorporated into the blend.

In the interest of obtaining uniformly coalesced elastomer coagula having carbon black thoroughly dispersed therein, it is helpful to maintain the liquefied elastomer-carbon slurry mixtures thoroughly agitated until coagulation has been effected. To this end, we prefer to flow the mixtures within the systems at velocities which assure turbulence, and have found that if coagulation of the elastomers is effected shortly after their comixture, i.e., within seconds or less, a homogeneous coagulum is obtained.

When more than one emulsified elastomer is used in carrying out the invention, they should be compatible when mixed together in the liquid state lest premature demulsification, creaming or coagulation occur. Similarly, when coagulating agents are used, one or more types may be employed to assure simultaneous coagulation of all the elastomers.

We have found that in the absence of dispersing agents or suspension stabilizing agents, such as are frequently used in the preparation of carbon black slurries for mixing with rubber latices, the conventional step of adjusting the pH characteristic of the slurry to that of the latex is not required and that, under such conditions, the carbon black acts as a creaming agent for the latex. Thus the conventional step of adding salt, or other creaming agent, to effect the creaming of the latex prior to coagulation, may be eliminated.

The process of our invention will be illustrated by the following specific examples:

EXAMPLE I

A crude carbon black slurry was formed by passing HAF carbon black beads and water into a certnifugal pump at uniform rates of 1 lb./min. and 19 lbs./min., respectively. On leaving the pump, the slurry was first passed through a dispersing apparatus and then a colloid mill wherein the carbon black beads were broken up and the carbon black particles thoroughly dispersed in the water. After leaving the colloid mill, the slurry was split into two equal portions. One portion and a stream of SBR latex, having a rubber solids content of about 21%, were introduced into a nozzle wherein both streams were thoroughly mixed together to form carbex. The other portion of the slurry was introduced into a flushing disperser along with a stream containing 1 part polybutadiene dissolved in 3 parts of hexane. The latex was introduced into the mixing nozzle at the rate of 4 lbs. 12 oz. per minute while the elastomer solution was introduced into the flushing disperser at the rate of 4 lbs./min.

The flushing disperser employed in this operation was constructed substantially in accordance with the apparatus described and claimed in U.S. Patent 2,972,493, except that the intermediate inlets for material shown in that patent were excluded. Within the flushing disperser, the elastomer solution and the aqueous carbon black dispersion were mixed and vigorously agitated to form a pseudo-emulsion. This pseudo-emulsion and the carbex were introduced into a nozzle wherein the two liquids were thoroughly mixed by violent hydraulic turbulence and shear and the mixture was injected into acidified hot water contained in a coagulation tank and subjected to mechanical agitation therein by means of a propeller mixer. The rubbers were simultaneously coagulated within the hot water to form a homogeneous crumb containing carbon black.

The temperature of coagulation was maintained at about 210° F. by injecting steam directly into the liquid contents of the tank. The pH of the water in which the coagulation was effected was maintained at about 1.0 with sulfuric acid. The hexane was vaporized and the vapors withdrawn from the coagulating tank, condensed, and recovered for dissolving more elastomer. The rubber crumb having the carbon black dispersed therein was separated from the acidified hot water and washed in fresh water to remove acid and soap residues. The crumb was then separated from the wash water and dried with air heated to about 210° F.–230° F. to remove essentially all of the water retained from the washing step.

A portion of the acidified hot water separated from the rubber crumb, i.e., about 35 gallons per minute, was recycled back to the coagulating tank while the remainder was disposed of as waste.

Yield determinations revealed that essentially all of the rubber and carbon black introduced into the coagulator was effectively formed into crumb. Examination of the crumb revealed that the rubbers were thoroughly blended together, with the carbon black being discretely dispersed throughout the blend.

EXAMPLE II

Conditions were maintained the same as in Example I except that an aromatic extending and plasticizing oil, of the type conventionally used, was mixed with the carbex and the pseudo-emulsion prior to their comixture and coagulation. This oil was added to the flowing latex stream at the rate of 0.30 lb./min. Another portion of the oil, at the rate of 0.30 lb./min., was added to the stream of elastomer solution introduced into the flushing disperser. Thorough mixing of the oil with the carbex and the pseudo-emulsion streams was accomplished by the violent hydraulic turbulence and shear imparted by the mixing nozzle and the flushing disperser. After co-mixing the two in another nozzle, the oil-containing carbex and pseudo-emulsion were coagulated as in Example I to form a rubber crumb.

Yield determinations revealed that essentially all of the rubber, carbon black and oil introduced into the coagulator were effectively formed into a rubber crumb comprising a uniform blend of the elastomers, the carbon black and the oil. Examination revealed that the carbon black was discretely dispersed throughout the rubber crumb.

EXAMPLE III

In this operation a blend of elastomers was formed in accordance with the invention without the inclusion of a rubber pigment or addition of a rubber processing or extender oil.

A solution of 12% by weight of cis-1,4 polybutadiene rubber in hexane and an oil extended SBR latex containing 10% solids, by weight, was used in forming a pseudo-emulsion from which the blend was produced by simultaneous coagulation of the respective rubbers.

To form the pseudo-emulsion, a stream of the latex and a stream of the dissolved elastomer were joined in a short conduit that served as an inlet to a flushing apparatus substantially as described in U.S. Patent 2,972,473, so that the pseudo-emulsion was formed in the flusher. The latex stream was supplied at the rate of 2100#/hr. while the dissolved elastomer stream was supplied at the rate of 1166#/hr. The amount of energy actually applied to the liquid streams for forming the pseudo-emulsion within the flusher was 0.0027 horsepower hour per pound of pseudo-emulsion, so that the amount of mechanical energy actually available for transfer into the elastomeric constituents of the liquid streams was 0.0259 horsepower hour per pound. The residence time of the liquids within the flusher during formation of the pseudo-emulsion was about 19.3 seconds, and the pseudo-emulsion was then transferred within a matter of seconds into a coagulation tank wherein the elastomers were agglutinated substantially in accordance with the method described in Example I to provide a homogeneous blend of the rubbers in the form of wet crumb. During the coagulation, the contents of the tank were agitated by means of a propeller rotating at 550 r.p.m., whereby the maximum amount of mechanical energy available for transfer into the pseudo-emulsion was 0.00063 horsepower hour per pond and 0.0059 horsepower hour per pound of solids content of the coagulum. The residence time of the coagulum within the coagulation tank was 3 to 4 minutes.

After coagulation, the wet crumb was removed from the coagulating tank, washed and dried to produce a homogeneous blend of the two rubbers at the rate of 350#/hr.

EXAMPLE IV

This operation was conducted substantially in accordance with Example III, except as herein specified, to produce a homogeneous blend of polybutadiene rubber, styrene-butadiene rubber and additional extending oil.

A stream of the latex was supplied at the rate of 1461 lbs./hr. while a stream of the dissolved polybutadiene was supplied at the rate of 763 lbs./hr. Prior to formation of the pseudo-emulsion within the flusher, an aromatic petroleum extending and plasticizing oil was introduced into the dissolved rubber stream, ahead of the flusher, at the rate of 102 lbs./hr.

The amount of energy actually applied to the liquid streams for forming the pseudo-emulsion within the flusher was 0.0039 horsepower hour per pound of pseudo-emulsion so that the amount of mechanical energy actually available for transfer into the elastomeric constituents and oil of the liquid streams was 0.0266 horsepower hour per pound. The residence time of the liquid streams within the flusher during formation of the pseudo-emulsion was 27.3 seconds and the pseudo-emulsion was then transferred within a matter of seconds to the coagulation tank.

By mechanical agitation of the contents of the coagulation tank, the maximum amount of mechanical energy available for transfer to the liquid pseudo-emulsion was 0.00089 horsepower hour per pound and 0.0061 horsepower hour per pound of solids content in the coagulum.

During the coagulation, the oil and the elastomer contents of the latex and cement were agglutinated to form wet crumb which was recovered, washed and dried to produce a blended elastomer composition, containing the additional oil, at the rate of 340 lbs./hr.

EXAMPLE V

This operation was conducted substantially in accordance with Examples III and IV except as herein indicated, to produce a blended elastomer composition containing dispersed carbon black and additional extending oil.

An 8%, by weight, aqueous slurry of carbon black was formed essentially in accordance with the method described in Example I and was fed to the inlet conduit of the flusher at the rate of 1351 lbs./hr. At the same time, a stream of the oil extended SBR latex, containing 21.5% solids, was fed to the inlet conduit at the rate of 315 lbs./hr. while a stream of cement containing 10% of cis-1,4 polybutadiene dissolved in hexane was fed to the inlet conduit at the rate of 677 lbs./hr. The aromatic petroleum extending oil was fed into the cement stream, prior to formation of the pseudo-emulsion, at a rate of 81.4 lbs./hr.

Accordingly, the crude mixture of cement containing the oil, latex and aqueous carbon black dispersion was subjected to agitation within the flusher to form a pseudo-emulsion and effect transfer of the carbon black particles from their aqueous medium to the elastomers. During formation of the pseudo-emulsion and transfer of the carbon black within the disperser, the actual amount of energy applied to the liquid streams was 0.0037 horsepower hour per pound so that the amount of mechanical energy actually available for transfer into the elastomer constituents of the streams, the carbon black and the oil was 0.0279 horsepower hour per pound. The residence time of the liquid streams within the flusher during formation of the pseudo-emulsion and transfer of the black to the elastomers was 27.2 seconds. After leaving the flusher, the pseudo-emulsion was transferred within a matter of seconds to the coagulation tank and agglutinated to form wet crumbs containing a uniform blend of the rubbers and oil having the carbon black dispersed therein. By mechanically agitating the contents of the coagulation tank, the maximum amount of mechanical energy available for transfer to the pseudo-emulsion was 0.00086 horsepower hour per pound and 0.0064 horsepower hour per pound of solids content in the coagulum. Subsequently, the coagulum was removed from the coagulation tank, washed and dried.

After drying, the uncured coagulum of Example V was examined to determine its composition and characteristics, and a composition containing the same ingredients was produced with conventional dry mixing methods for blending the rubbers and pigment in dry form.

A comparison of the compositions obtained in accordance with the process of Example V and in accordance with conventional dry mixing methods is shown in Table I.

TABLE I

|  | Cis-1,4 polybutadiene | Parts by Weight Oil extended SBR Rubber | Additional Oil | Carbon Black |
|---|---|---|---|---|
| Blend of Ex. V | 50 | 50 | 60 | 80 |
| Dry Mix | 50 | 50 | 60 | 80 |

TABLE I—Continued

|  | Moisture, percent by Wt. | Carbon Gel, percent | Mooney Visc.; ML-4 at 212° F |
|---|---|---|---|
| Blend of Ex. V | .3 | 34 | 57.5 |
| Dry Mix |  | 17 | 48.5 |

Portions of each of the blends shown in Table I were mixed with compounding ingredients, as shown in Table II, and cured at 293° F. to form a finished rubber composition:

Table II

Material: Parts by weight
Blend _____ 240
Zinc oxide _____ 5.0
Stearic acid _____ 2.0
Santocure [1] _____ 1.0
Sulfur _____ 2.3

[1] Registered trademark for n-cyclohexyl-2-benzothiozol sulfenamide, an accelerator, manufactured by Monsanto Company, Rubber Chemicals Department.

After curing, the rubber compositions were tested to determine their physical properties and relative quality. Test results are shown in Table III.

TABLE III

|  | Blend of Ex. V | Dry Mix |
|---|---|---|
| Optimum Cure, Mins | 55 | 60 |
| 20′ L-300 Modulus, p.s.i | 460 | 150 |
| 20′ Tensile, p.s.i | 1,750 | 520 |
| 60′ L-300 Modulus, p.s.i | 1,070 | 1,000 |
| 60′ Tensile, p.s.i | 2,660 | 2,480 |
| 60′ Elongation, percent | 605 | 575 |
| 60′ Shore Hardness | 57 | 54 |
| 100′ Tensile, p.s.i | 2,620 | 2,420 |
| Maximum Tensile, p.s.i | 2,670 | 2,480 |
| Visual Dispersion* | 7.8 | 4.0 |

*10=Excellent, 1=Very Poor.

Thus, it can be seen that the cured rubber composition made from the pigmented, elastomer blend of Example V was superior from the standpoint of tensile strength, elongation, and modulus development. It should also be noticed that the dispersion of the carbon black in the blend of Example V was approximately twice as good as in the dry mix.

It is understood that various changes and modifications can be made by those skilled in the art respecting the details and embodiments of the present invention as hereinabove set forth without departing from the scope of the invention as set forth in the appended claims.

Therefore, we claim:

1. A process for producing a homogeneous, blended elastomer coagulum comprising:
    (a) compounding an elastomer in latex form with an elastomer dissolved in a water immiscible organic solvent by mixing in liquid form, with agitation, to form a pseudo-emulsion in which the elastomers are thoroughly compounded in the liquid phase, and
    (b) thereafter agglutinating the mixed elastomers simultaneously, without further compounding, by heating the thus-formed pseudo-emulsion in the presence of a latex coagulating agent at a temperature sufficient to vaporize said organic solvent, said temperature being such as to preclude substantial vaporization of the water in the pseudo-emulsion, and
    (c) removing said organic solvent from the presence of the elastomers, whereby the resultant elastomer coagulum is formed as a crumb in the presence of water in the liquid phase.

2. The process of claim 1 in which a rubber pigment is uniformly dispersed in the pseudo-emulsion prior to coagulation.

3. The process of claim 2 in which the rubber pigment is carbon black.

4. The process of claim 1 and including the washing of the resultant crumb with water and drying to produce an essentially moisture-free blended elastomer coagulum.

5. The process of claim 1 in which water in addition to that present in the latex is included in the pseudo-emulsion prior to coagulation of the mixed elastomers therein.

6. The process of claim 1 in which the simultaneous coagulation of the respective elastomers from the pseudo-emulsion is effected by mixing the pseudo-emulsion with an aqueous solution of a latex coagulating agent at a temperature in excess of the boiling point of the organic solvent of the elastomer solution.

7. The process of claim 1 in which an oil is dispersed in the pseudo-emulsion prior to coagulation of the mixed elastomers.

8. The process of claim 1 in which the elastomer constituent of the latex is a butadiene-styrene copolymer.

9. The process of claim 1 in which the elastomer constituent of said elastomer solution is a stereo-specific rubber.

10. The process of claim 1 in which the compounding of the elastomers in liquid form is accomplished by mechanical agitation, the amount of mechanical energy transferred to the blended elastomers per unit of mass and time during coagulation thereof being relatively less than the amount of mechanical energy transferred to the elastomers during the compounding to form the pseudo-emulsion.

11. The process of claim 10 in which the pseudo-emulsion is produced by mechanically agitating the elastomers in liquid form and the coagulation of the blended elastomers is effected under mechanical agitation, wherein the input of mechanical energy to the liquid streams per unit of mass and time in producing the pseudo-emulsion is on a relatively higher level than that employed during coagulation of the elastomers.

12. The process of claim 11 in which the level of mechanical energy input employed for formation of the pseudo-emulsion is within the range of about 2 to 3 times greater than the level of mechanical energy employed for agitation during coagulation.

13. The process of claim 10 in which carbon black is dispersed in the pseudo-emulsion prior to agglutination of the elastomers, the resulting blended elastomer coagulum contains a uniform dispersion of said carbon black therein.

14. A method for producing a homogeneous blended elastomer coagulum which comprises mixing together an elastomer in latex form and an elastomer dissolved in a water immiscible organic solvent, combining said mixture with a latex coagulating agent, vaporizing and removing said solvent from said mixture, and then removing water from the resulting wet crumb blend of the two elastomers by liquid phase separation prior to drying of the blended elastomers.

15. A method of blending a solution polymerized rubber with an emulsion polymerized rubber, which comprises mixing together a rubber in latex form with a rubber dissolved in a water immiscible organic solvent, immediately feeding the resulting mixture into a coagulating zone wherein said sixture is maintained under acid conditions and said solvent is vaporized and is then removed from the mixture, and removing water from the resulting wet crub rubber blend of the two elastomers by liquid phase separation prior to drying of the rubber blend.

16. The method of claim 15 wherein a highly aromatic extender oil emulsion is combined with said mixture upstream from said coagulation zone.

17. The method of claim 15 wherein a carbon black slurry is combined with said mixture upstream from said coagulation zone.

18. The method of claim 15 wherein said dissolved rubber is cis-polybutadiene and the rubber in latex form is selected from the group consisting of homopolymers of conjugated dienes containing 4 to 8 carbon atoms per molecule and copolymers of a major amount of said conjugated dienes with a minor amount of styrene.

19. The process of claim 9 in which the elastomer constituent of the elastomer solution is selected from the group consisting of cis-1,4 polybutadine, trans-1,4 polybutadiene, cis-1,4 polyisoprene, ethylene-propylene rubber, and mixtures of trans-1,4 polybutadiene with cis-1,4 polybutadiene and 1,2 polybutadiene.

References Cited

UNITED STATES PATENTS

| 2,767,152 | 10/1956 | Bierman et al. | 260—894 |
| 2,986,547 | 5/1961 | Jefts et al. | 260—41 |
| 3,145,189 | 8/1964 | Fourier | 260—894 |
| 3,166,609 | 1/1965 | Wilder | 260—894 |

FOREIGN PATENTS 543,875  6/1956  Belgium.

ALLAN LIEBERMAN, Primary Examiner

U.S. Cl. X.R.

260—33.6, 41.5, 415, 889, 894